United States Patent [19]
Brevko et al.

[11] 3,743,360
[45] July 3, 1973

[54] DRY POWDER AND DUST FEEDING APPARATUS

[75] Inventors: Robert Brevko, Peters Township; John R. Mucka, McCandless Township, both of Pa.

[73] Assignee: Auburn Engineering Inc., Pittsburgh, Pa.

[22] Filed: Sept. 24, 1971

[21] Appl. No.: 183,338

Related U.S. Application Data

[63] Continuation-in-part of Ser. No. 775,621, Nov. 14, 1967, Pat. No. 3,608,379.

[52] U.S. Cl. .............. 302/36, 73/432 PS, 141/392, 302/58
[51] Int. Cl. ............................................. B65g 53/42
[58] Field of Search ........................ 222/193, 195; 302/36, 58; 141/67, 392; 73/432 PS

[56] References Cited
UNITED STATES PATENTS
3,656,517   4/1972   Taylor et al. ................ 222/194 X
1,349,751   8/1920   Cross ............................... 302/58
3,587,671   6/1971   Gamberini ....................... 141/67
1,405,173   1/1922   Wheeler .......................... 302/58
1,355,507   10/1920  Roever .......................... 302/58 X FOREIGN PATENTS OR APPLICATIONS
830,780    2/1956   Great Britain ..................... 222/195

*Primary Examiner*—Richard C. Queisser
*Assistant Examiner*—Daniel M. Yasich
*Attorney*—Parmelee, Utzler & Welsh

[57] ABSTRACT

A dust feeder is disclosed having a circular dust-holding trough for holding a predetermined weight of dust. Means is provided for rotating the trough at a predetermined speed. A suction nozzle of a width effective across the entire width of the trough is arranged to remove dust from the trough as the trough rotates whereby a known amount of dust may be removed in a known interval of time, and when necessary, the weight of any dust retained in the trough may be determined. Other dry powders and particulate material may be used in place of dust.

4 Claims, 6 Drawing Figures

INVENTOR.
Robert Brevko
John R. Mucka
BY Parmelee, Utzler & Welsh
Attorneys

INVENTOR.
Robert Brevko
John R. Mucka
BY
Parmelee, Utzler & Welsh
Attorneys

INVENTOR.
Robert Brevko
John R. Mucka
Attorneys

DRY POWDER AND DUST FEEDING APPARATUS

This application is a continuation-in-part of our allowed application Ser. No. 775,621, filed Nov. 14, 1967, now U.S. Pat. No. 3,608,379 dated Sept. 28, 1971. Whereas said application Ser. No. 775,621 discloses an apparatus for testing filters wherein a predetermined amount of dust can be supplied to a filter under test in a known period of time, the present invention is for a specific form of dust pickup or feeding device for use with that or other apparatus.

In various testing and other operations it may be desirable to remove dust, powder or finely divided particulate material in a known amount at a known rate for delivery to other apparatus, as for example, in our parent application, the air input of a filter testing apparatus to determine the effectiveness of a filter being tested. To this end a preferred embodiment of the present invention provides a turntable with means for rotating it at a preset speed. The turntable supports an annular trough which is preferably removable. The dust or other material of known weight is placed in the trough and leveled off to a uniform depth, whereupon suction is generated in a fixed nozzle accurately positioned in the trough arranged to progressively move substantially all of the dust as the turntable is rotated at a normally constant speed relatively to the nozzle through a predetermined arc, usually about 360°.

BRIEF DESCRIPTION OF THE DRAWINGS

In the drawings showing a preferred embodiment of the invention.

Figure 1:
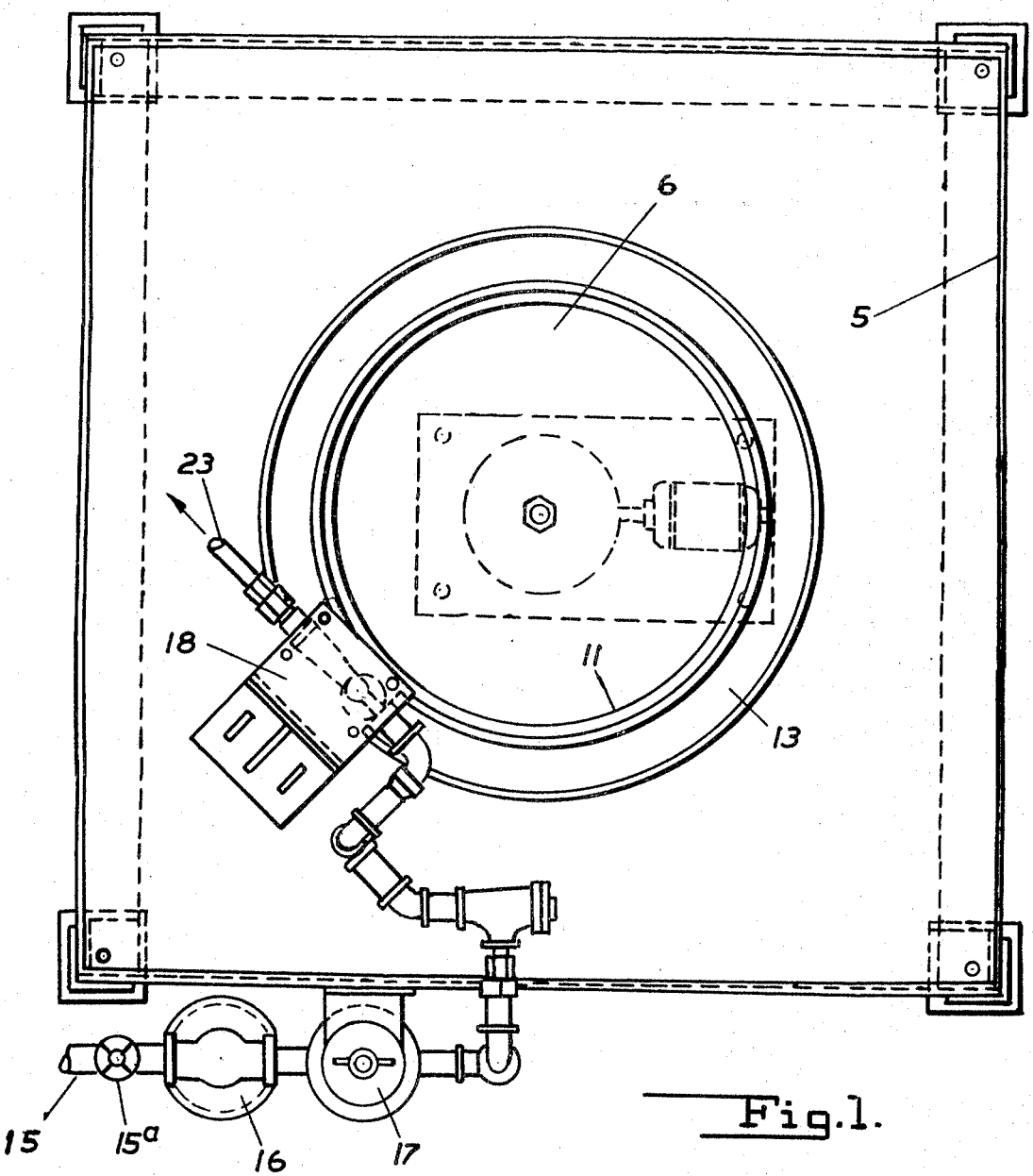
FIG. 1 is a plan view of the dust feeder.
Figure 3:
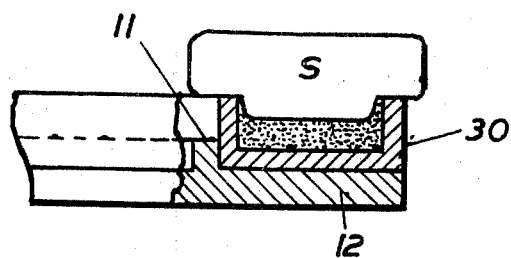
FIG. 3 is a fragmentary view, partly in elevation and partly in vertical section illustrating the leveling-off of the dust or other material in the trough.
Figure 2:
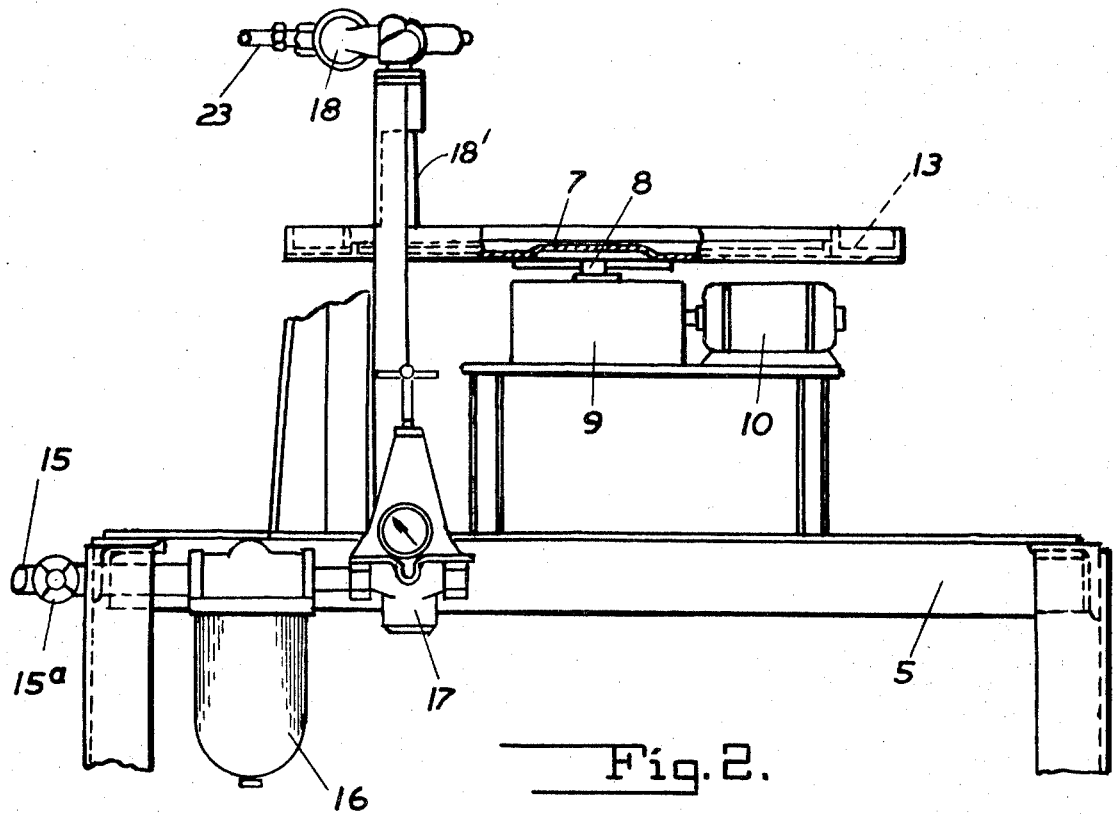
FIG. 2 is a side elevation of the apparatus shown in FIG. 1.

Referring to the drawings and particularly to FIGS. 1 to 5 inclusive, the feeder comprises a supporting structure 5 on which is a turntable 6 of a selected size. Typically a turntable of 24 inches in overall diameter is suitable, but it may be more or less, depending on the type of test or other factors. It is secured to a disk 7 fixed to the top of a rotatable shaft 8 extending upwardly from a speed reducer conventionally indicated at 9. The speed reducer 9 is driven by an electric motor 10, usually a motor of a selected constant speed. For a standard test of filters as described in now issued patent above referred to, the speed reducer in a typical case will rotate the shaft 8 at a speed of 1 revolution per hour. There is a shoulder or curb 11 on the top of the turntable near the periphery providing a marginal supporting area 12 for receiving and holding an annular removable material-holding trough 13 having a flat bottom and square sides in a concentric position on the turntable.

Depending on the test to be run, a weighed amount of dust or other powder-like or fine particulate material is poured into the trough and leveled off to a predetermined uniform depth. The leveling or uniform distribution of the material in the trough is accomplished by using a strike-off or screed marked S in FIG. 3 (and also in FIG. 6) which is of T-shape so constructed that the cross-bar of the T spans the width of the trough and rests on the two sides as it is moved around, and the stem is of a width such that when the strike-off is radial to the center of rotation of the trough it has a sliding fit between the side walls of the trough and it extends below the cross bar to a predetermined distance to level the material in the trough to a selected depth. Different strike-off tools S may be provided for different depths of material. The weight of the material will have been previously determined so that by holding the tool in one's hand and moving it around the trough, material which has been more or less haphazardly placed around in the trough can be leveled out to the required uniformity.

Figures 4, 5:
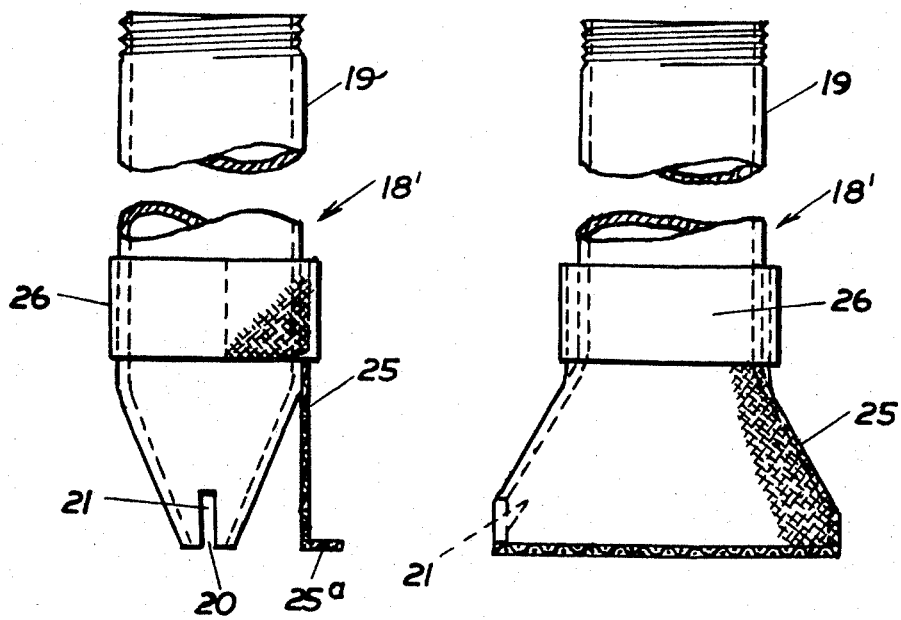
FIG. 4 is a side elevation on a larger scale of the suction nozzle.
FIG. 5 is a front elevation of the nozzle shown in FIG. 4.

An air line 15 connected to a source of compressed air (not shown) has an air line filter 16 therein of a known construction and a pressure regulator and gauge 17. It supplies air to an aspirator 18 located above the trough of the turntable. The aspirator is adjusted to generate a desired degree of suction in a depending normally stationary nozzle 18 that projects down into the annular channel or trough 13 but not to the bottom of the trough so that when the motor 10 is operated the trough rotates relatively to the nozzle at a constant speed as above described. As best seen in FIGS. 4 and 5 it has a tubular body 19 that tapers to a narrow slot 20 as viewed from the side, but the lower end of which flares outwardly to substantially the full width of the trough as viewed from the front as in FIG. 5. The tips of the flared sides of the nozzle have a vertical slot 21 therein forming a continuation of the slot 20 across the bottom to better remove dust that may cling to the sides of the trough. For a typical dust feeder for filter testing the bottom of the nozzle is about 10 mils (0.010 in.) above the bottom of the trough. The dust or other material and the air from the aspirator are discharged into a tube 23 to be carried to a point of discharge in a testing, analyzing or processing equipment.

The action of the nozzle in maintaining a more uniform flow of dust is improved by attaching a wire mesh screen 25 vertically at the front of the suction nozzle by means of a collar 26. This screen is of a width at its lower end substantially coextensive with the width of the nozzle and its lower end is turned forwardly to provide a horizontal ledge 25a at the level of the bottom of the nozzle.

The aspirator may be controlled by the use of the pressure regulator 17, and of course there is usually an on-and-off valve 15a in the supply line.

The dust pick-up arrangement as herein provided supplies dust to the testing apparatus in the testing of filters more accurately and uniformly than any other apparatus for this purpose with which we are familiar.

Figure 6:
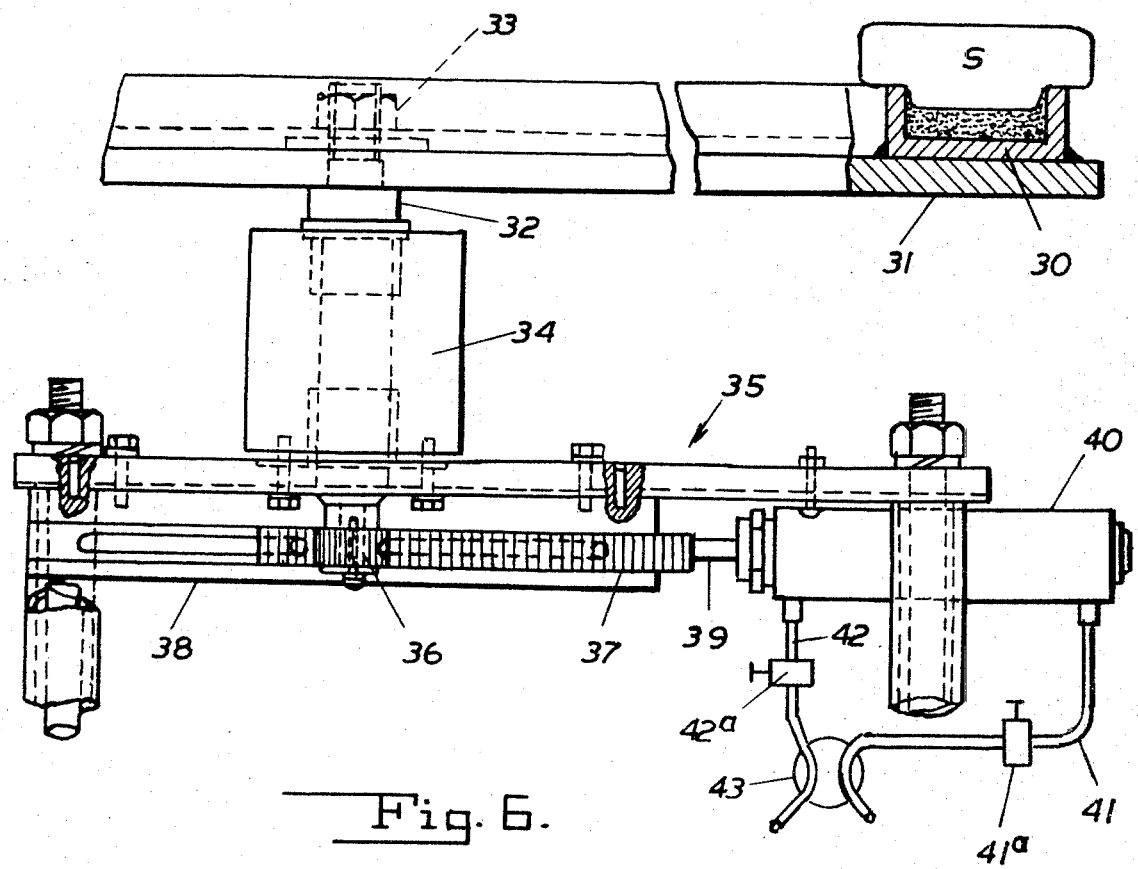
FIG. 6 is a partial side elevation of a modified construction, certain parts being in section.

While we have shown an electric motor for rotating the turntable relative to the nozzle, the modification shown in FIG. 6, wherein like reference numerals indicate corresponding parts, may be employed. In this case the material-holding circular trough or channel 30 is fixed on the turntable 31 and the entire turntable is removably held on a spindle 32 by a clamping nut 33. The spindle is mounted in a bearing-supporting element 34 through which the spindle passes. The support 34 is mounted on a frame structure 35.

There is a pinion 36 on the lower end of the spindle. There is a reciprocable rack 37 meshing with the pinion and the rack is guided for movement along a slotted plate 38 on the supporting structure. The rack is attached to a piston rod 39 having a piston (not shown) in a fluid pressure cylinder 40. Tubes 41 and 42 communicating with opposite ends of the cylinder selectively supply fluid under pressure to one end or the other of the cylinder from a source of fluid pressure (not shown). There is schematically illustrated a reversing flow control valve 43 for controlling the operation of the cylinder from a source of fluid pressure (not shown), and each line also has a manually adjustable needle or other valve, designated 41a and 42a, respectively.

This apparatus has certain advantages in that the turntable movement is more simple to control. For example, if after a test of filter has been started and the filter under test quickly develops an imperfection the turntable can be instantly reversed and returned at high speed to its starting position, and while this can be done with an electric motor drive through a ratchet or friction clutch arrangement, the rack and pinion drive is simpler and more easily controlled. In either form of apparatus here described, relative movement is effected between the nozzle which is stationary and the trough which is rotated at a predetermined controlled rate so that the material in the trough, having been leveled to a substantially uniform depth, is withdrawn from the trough progressively at a controlled uniform rate as long as the aspirator operates with a constant pressure of air being supplied to the aspirator.

The invention to date has been primarily used with dust in testing automotive air filters to simulate severe road conditions, its application is not limited to this field or to use with dust and the term "and like material" as herein used and the term "dust and like material" is intended to include dust, such as road dust used in testing automotive air filters, powders of various kinds and finely divided dry particulate substances.

We claim:

1. A feeder for supplying finely divided material such as dust, powder and the like to an apparatus to which it is to be delivered at a predetermined rate, comprising:
   a. a trough into which a measured amount of the material may be placed and to a uniform depth,
   b. a suction nozzle with its lower end terminating in said trough at a level intermediate the top and bottom of the trough and with an inlet opening therein effective across the full width of the trough,
   c. means for creating a suction in said nozzle to draw said material from the trough and transport the material in air to a point of discharge to a filter testing apparatus, and
   d. means for effecting relative movement at a predetermined rate and for a predetermined distance between the nozzle and the trough to effect progressive withdrawal of the material from the trough at a controlled rate for a definite time interval.

2. A feeder for supplying finely divided material such as dust, powder and the like to an apparatus to which it is to be delivered at a predetermined rate, comprising:
   a. a circular dust holding trough having a flat bottom and vertical sides so that a predetermined weight of dust powder or the like may be evenly distributed to a uniform depth around the trough,
   b. a relatively fixed suction nozzle terminating in said trough with the nozzle having an inlet opening for dust of a width adequate to remove dust from across the full width of the trough, the nozzle terminating in the trough below the top thereof and above its bottom,
   c. means for creating the suction in the nozzle and discharging dust removed through the nozzle by suction and discharging it into a filter testing apparatus, and
   d. means for rotating the circular trough through a preselected arc at a controlled constant speed to effect progressive removal of a selected amount of dust at a substantially constant rate in a selected period of time.

3. A finely divided material feeder as defined in claim 2 wherein the trough has a flat bottom and square sides and wherein the nozzle terminates in a transversely flared portion with a slot across the bottom and part way up the sides.

4. Apparatus as defined in claim 3 where the nozzle has a vertical screen carried thereon with the screen spaced forwardly of the transversely flared portion of the nozzle, the screen having a forwardly projecting lip along its lower edge at the leading face thereof.

* * * * *